(No Model.)
D. R. BROWN.
HORSE DETACHER.
No. 500,186. Patented June 27, 1893.
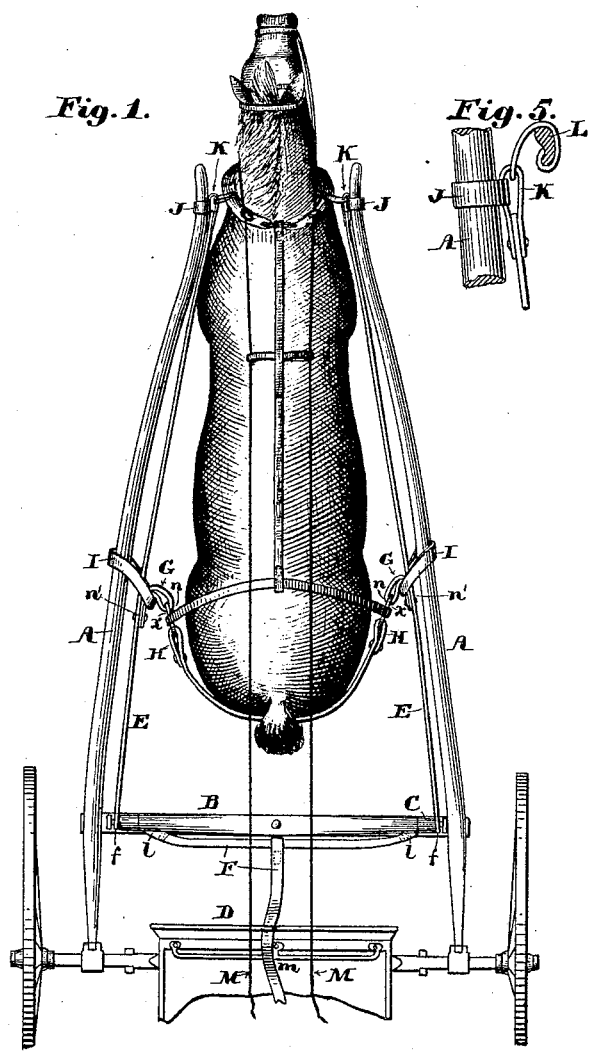
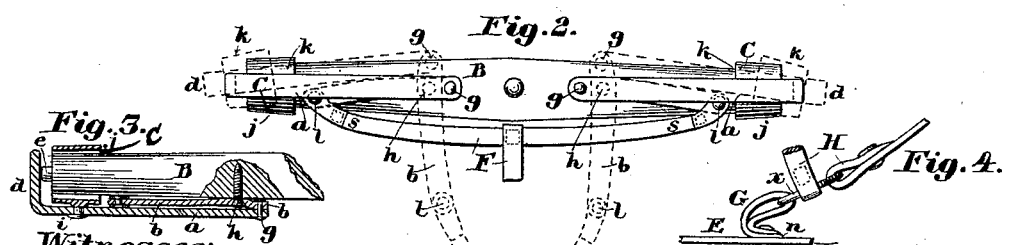
Witnesses:
J. A. Williams
O. H. Brown
Inventor:
David R. Brown

UNITED STATES PATENT OFFICE.

DAVID R. BROWN, OF COTTAGEVILLE, SOUTH CAROLINA.

HORSE-DETACHER.

SPECIFICATION forming part of Letters Patent No. 500,186, dated June 27, 1893.

Application filed September 21, 1892. Serial No. 446,469. (No model.)

*To all whom it may concern:*

Be it known that I, DAVID R. BROWN, a citizen of the United States, residing at Cottageville, in the county of Colleton and State of South Carolina, have invented certain new and useful Improvements in Horse-Detachers; and I do declare the following to be a full, clear, and exact description of the invention, such as will enable others skilled in the art to which it appertains to make and use the same.

My invention relates to improvements in devices for detaching horses from vehicles, and it has for its general object to provide a detaching device embodying such a construction that the horse may be readily released by a person seated in the vehicle, and may leave the shafts without interference.

Other objects and advantages will appear from the following description and claims when taken in connection with the accompanying drawings, in which—

Figure 1, is a plan view of a vehicle, embodying my invention, a horse being illustrated as hitched thereto. Fig. 2, is an inverted plan view of the whiffletree, removed from the shafts. Fig. 3, is a detail view of the whiffle-tree with parts in section. Fig. 4, is a detail view, illustrating the manner of connecting the traces to the breeching; and Fig. 5, is a detail view, illustrating the manner of connecting the shafts to the collar hames, whereby a saddle may be dispensed with.

In the said drawings: A, indicates a pair of thills or shafts.

A′, indicates a vehicle to which the shafts are connected, and B, indicates a whiffle-tree which is pivotally mounted upon the cross bar of the shafts in the ordinary manner. This whiffle-tree B, is provided at its ends with two longitudinally extended lugs or studs e, which are designed to engage and hold the traces E, and it is also provided with the slidable sleeves C, which are mounted upon its ends, and the slidable bars a, which are connected to the sleeves as better shown in Fig. 3, of the drawings. The slidable bars a, are provided at their ends with angular branches d, which serve to engage the lugs or studs e, and hold the traces thereon; and inasmuch as the bars a, and the sleeves C, are fixedly connected together, it will be seen that when the said bars are moved outwardly to uncover the studs e, the sleeves C, will engage the traces and push them off said studs, and thus disconnect the traces from the whiffletree.

Pivotally connected to the whiffletree B, as shown at h, and to the slidable bars a, as shown at g, are the levers b, through the medium of which the said bars a, are actuated to effect a disconnection of the traces from the whiffletree. These levers b, normally rest beneath the whiffletree, as illustrated, and they have their ends connected as shown at l, to the oppositely extending branches of the hand strap F, which extends through the dash D, of the vehicle, within convenient reach of the driver. Through the medium of this strap F, and the levers b, it will be seen that as soon as a horse starts to run away or when it is desired to release a horse, he may be readily released by the driver and thus damage to the vehicle may be obviated.

I, indicates the hold back straps which may be connected to the shafts A, in any approved manner.

H, indicates an ordinary harness breeching provided with the usual eyes x, and G, indicates the hold back tugs through the medium of which the traces are connected to the breeching. These tugs G, are looped through the eyes of the breeching as shown at n, and are passed through the straps l, and connected to the traces as illustrated, whereby it will be seen that when the traces are released from the whiffle-tree, they may pass through the straps I, without danger of being caught or retarded thereby.

The traces E, are provided at their forward ends with loops as K, which serve to connect them to the hames L, of the collar N, as better shown in Fig. 5. These loops K also serve to effect a connection between the traces and the collars J, which are designed to receive and support the shafts, as illustrated. In some cases, however, the collars J, might be fastened to the traces, just behind the loops K, in any approved manner. By this manner of supporting the shafts, the horse, when released from the whiffle-tree, may draw out of the shafts without any interference from the harness, which is an important desideratum. Furthermore by the provision of the construction described, the ordinary harness saddle which is very objectionable in hot weather may be dispensed with.

In the practical operation of my invention, the horse may be readily released from the vehicle by simply pulling upon the strap F, and he may be as readily hitched up again by simply running the shafts through the collars J and passing the traces through the straps I, and connecting them to the whiffletree in the manner set forth.

It will be readily noted from the foregoing description taken in connection with the drawings, that my improved device is very simple, cheap, and durable; that it may be conveniently operated to effect the purpose stated.

While I have described in detail a whiffletree of the construction shown and provided with the studs e, at opposite ends, yet it will be found in practice that the whiffletree which is now so commonly used and is not provided with irons at the end but is simply flattened to receive the trace, might be employed in connection with my improvements.

Having described my invention, what I claim is—

1. In a horse detaching device, the combination with the whiffletree; of the slidable sleeves C, mounted on opposite ends thereof, the slidable bars a, connected to said sleeves at i, and having the angular branches d, the levers b, pivotally connected to the whiffletree, at h, and to the slidable bars at g, the hand strap F, extending through the dash of the vehicle at one end, and connected at its opposite end to the said levers b, all adapted to operate, in connection with the harness, having the loops K, connected with the hames and the loops G, connected to the breeching and traces, substantially as specified.

2. In a horse detaching device, the combination with a pair of shafts, the whiffle-tree mounted thereon, and the tug straps I, connected to the shafts; of a harness comprising a collar and hames, a breeching, the traces E, detachably connected to the whiffletree and having the loops K, at their forward ends connected to the hames, the collars J, connected to the loops K, or to the traces just behind the loops K, and adapted to receive the shafts, the tug loops G, connected to the breeching and traces and taking through the tug straps I, and a suitable means for disconnecting the traces from the whiffletree, substantially as and for the purpose set forth.

In testimony whereof I affix my signature in presence of two witnesses.

DAVID R. BROWN.

Witnesses:
J. A. WILLIAMS,
O. H. BROWN.